(No Model.)
M. ANTHONY.
DIVIDER ATTACHMENT FOR MOWERS.
No. 446,316. Patented Feb. 10, 1891.
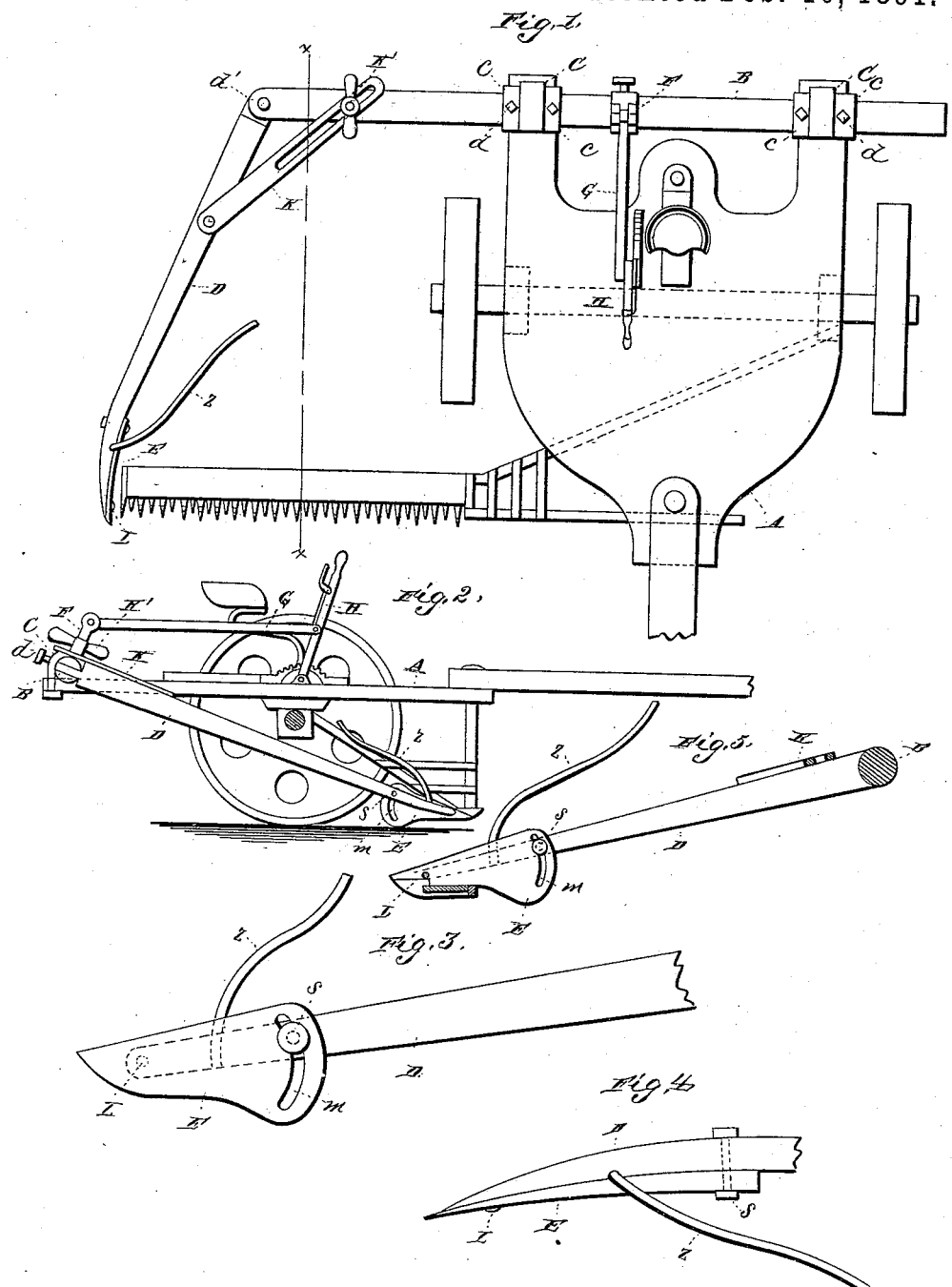
WITNESSES
INVENTOR
Mark Anthony.
by E. W. Anderson
his Attorney

UNITED STATES PATENT OFFICE.

MARK ANTHONY, OF SAN FRANCISCO, CALIFORNIA.

DIVIDER ATTACHMENT FOR MOWERS.

SPECIFICATION forming part of Letters Patent No. 446,316, dated February 10, 1891.

Application filed June 21, 1890. Serial No. 356,242. (No model.)

*To all whom it may concern:*

Be it known that I, MARK ANTHONY, a citizen of the United States, and a resident of San Francisco, in the county of San Francisco and State of California, have invented certain new and useful Improvements in Divider Attachments for Mowers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a top plan view. Fig. 2 is a side view, and Figs. 3, 4, and 5 are detail views.

This invention has relation to mower dividers or attachments for separating cut from standing grass; and it consists in the construction and novel combination of parts, as hereinafter set forth.

In the accompanying drawings, the letter A indicates a portion of the frame-work of a mower, which will vary with the construction, as the attachment which forms the subject of this invention is designed to be applied to mowers of different kinds, the ordinary or common divider now in use being removed.

B represents a transverse shaft or rocking bar, which is seated in bearings C C opposite to the frame, and having collars $c$, secured thereto by means of set-screws $d$. By loosening the set-screws in said collars and in the collar attached to the arm F the bar B may be adjusted lengthwise. From the outer end of this bar extends forward and outward the divider-arm D, pivotally secured at $d'$ and braced by the brace K, and which is usually provided with the divider-blade E.

F is an arm extending upward from the rock-shaft B, and having a connection G, extending forward and pivoted to a hand-lever H, which is pivoted to the frame of the machine and is provided with an arc rack to secure the adjustment. This handle is arranged near the driver's seat, so that it will be within easy reach of the hand.

The divider point or blade is vertically adjusted to the proper height for the grass by means of the rock-shaft B and the hand-lever H, connected thereto by the arm F and extension G, so that as the mower moves forward the cut grass will be caused to fall behind the sickle-bar in the proper manner, instead of falling over against the standing grass and clogging the machine on its next round.

The dividers in general use are of such a character that they allow the cut grass to fall over them against the standing grass, and this is especially the case in mowing a sloping or side-hill field, and in passing over the ground they impart a vibratory or shaking movement to the cutter-bar. These difficulties are designed to be avoided by the use of my divider, which can be adjusted to the height desired to engage the grass near its top and to guide it over the sickle-bar in the proper manner.

The arm D of the divider is usually pivoted to the outer end of the rock-shaft, so that it may be vertically and horizontally adjusted. By rotating the rock-shaft by means of the handle H and its connections the divider-arm may be vertically adjusted to a greater or less height, according to the length of the grass and according to the closeness or intimate connection of the tops, for in some fields of grass the tops are more or less tangled or connected together. To secure the horizontal adjustment a strap connection or brace K is employed, said brace being pivotally connected to the divider-arm and having a longitudinal slot at its opposite end, through which a set-screw or clamp-screw K' on the rock-shaft is passed to secure the arm in its inner or outward adjustment. The strap K also acts as a brace for the arm in its vertical adjustment.

I prefer to make the divider-blade somewhat free to move by pivoting its front end to the divider-arm, as at L, and providing its rear portion with an arc-shaped guide-slot $m$, engaging a stud $s$ of the divider-arm. In this manner the blade is allowed to dip or to rise over an obstruction without disarranging the position of its point portion. The blade E, however, may be dispensed with, and the arm D would still perform the required service. I provide a high guide Z, which is secured to and extends from the front portion of the arm backward, inward, and upward to engage and guide inward higher portions or tops of the grass which might otherwise fall over the lower divider plate or arm. If the grass is very much tangled at top, so that it will remain standing or not easily fall under the guiding action of the divider, blade, and higher guide, it will be forcibly leveled or pushed downward, coming in contact with the transverse rock-shaft, which is connected to the rear portion of the frame of the mower.

Having described this invention, what I claim, and desire to secure by Letters Patent, is—

1. The combination, with the mower-frame, of the horizontally-adjustable rock-shaft having the adjusting-collars $c$ and the set-screws $d$ and the divider-arm pivoted to the said rock-shaft, substantially as specified.

2. The combination, with the mower-frame, of the rock-shaft, the divider-blade, the slotted strap K, the thumb-screw K', and the handle H and its connections F and G, whereby said divider may be vertically and horizontally adjusted, substantially as specified.

In testimony whereof I affix my signature in presence of two witnesses.

MARK ANTHONY.

Witnesses:
PHILIP C. MASI,
CHAS. L. TAYLOR.